United States Patent
Suboski

[19]

[11] Patent Number: 6,161,279
[45] Date of Patent: Dec. 19, 2000

[54] PIERCE NUT MOUNTING DIE

[76] Inventor: Alan L. Suboski, 7205 Bowers Rd., Imlay City, Mich. 48444

[21] Appl. No.: 09/335,788

[22] Filed: Jun. 18, 1999

[51] Int. Cl.[7] .................................................... B23P 11/00
[52] U.S. Cl. ......................... 29/798; 29/432.2; 83/698.91
[58] Field of Search ................................. 29/432.2, 798; 83/698.91, 698.71, 699.11

[56] References Cited

U.S. PATENT DOCUMENTS

| | | | |
|---|---|---|---|
| 1,279,362 | 9/1918 | Krueger | 29/432.2 |
| 2,364,401 | 12/1944 | Stellin | 83/698.71 |
| 3,282,143 | 11/1966 | Wierscheim | 83/698.71 |
| 3,811,171 | 5/1974 | Grube | 29/432.2 |
| 5,146,672 | 9/1992 | Muller | 29/798 |
| 5,239,740 | 8/1993 | Ladouceur | 29/432.2 |
| 5,502,888 | 4/1996 | Takahashi et al. | 29/798 |

*Primary Examiner*—David P. Bryant
*Assistant Examiner*—Jermie E. Cozart

[57] ABSTRACT

A pierce nut mounting die for supporting and backing a metal sheet when a pierce nut is forcibly punched through the sheet for interlocking with the sheet, comprises a tubular body having a support end for engaging the sheet and for deforming a portion of the sheet into an interlock with the nut. The support end of the die body is provided with a transverse notch, which is generally trapezoidal in shape. A plug, shaped correspondingly to the notch is removably positioned within the notch. The exposed end of the plug, that is, the end which is exposed through the notch opening, defines the smaller base of the trapezoidal shape and is provided with a raised bead. The bead surrounds an opening provided in the plug, which opening is coaxially aligned with an opening in the base for the passage of a punched out slug of sheet material resulting from the pierce nut punching through the sheet material. The bead engages and deforms a portion of the sheet material defining the edge of the punched out opening for clinching the sheet material and pierce nut together. The plug is manually removable and replaceable with a similar plug, whenever the bead becomes damaged or worn due to usage in mounting pierce nuts on thin metal sheets, without necessarily disturbing the position of the die body.

10 Claims, 2 Drawing Sheets

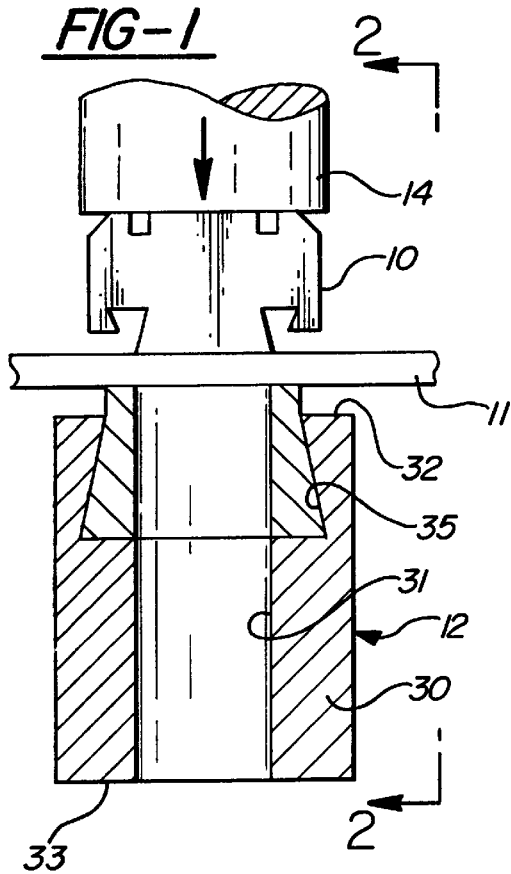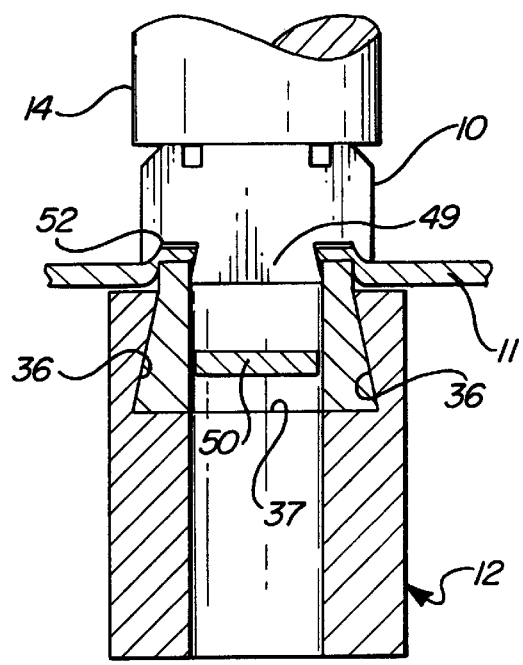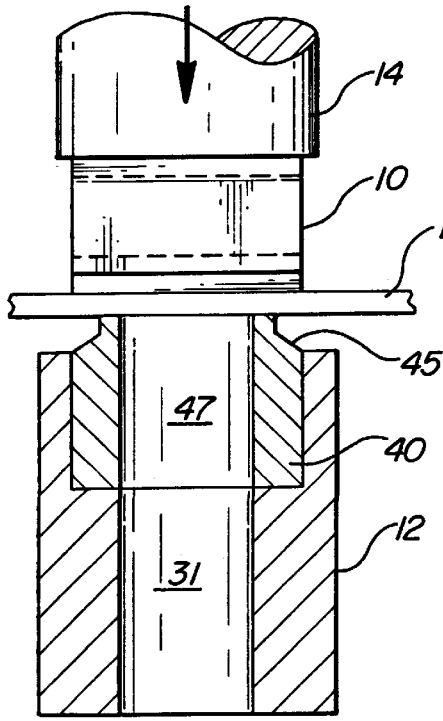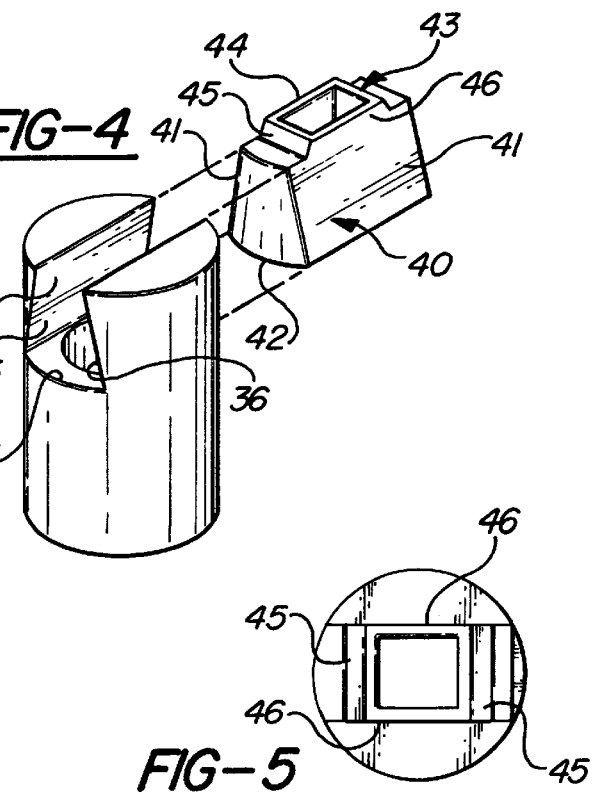

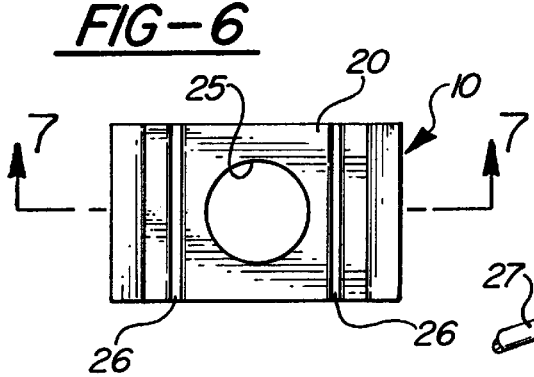
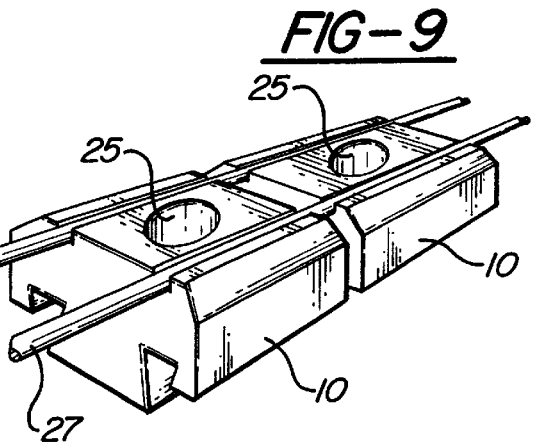
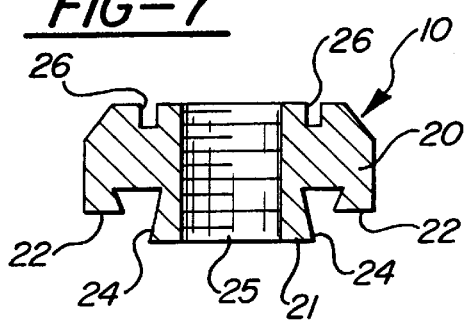
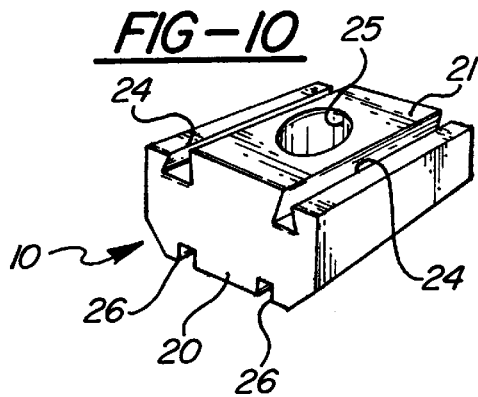
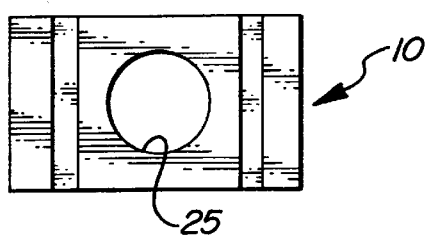
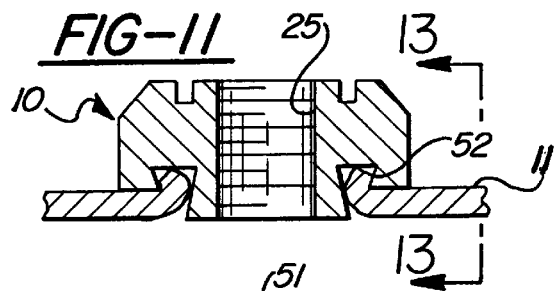
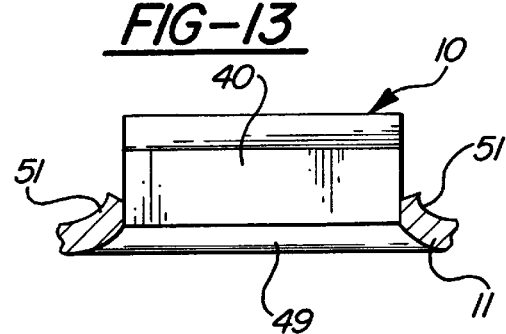
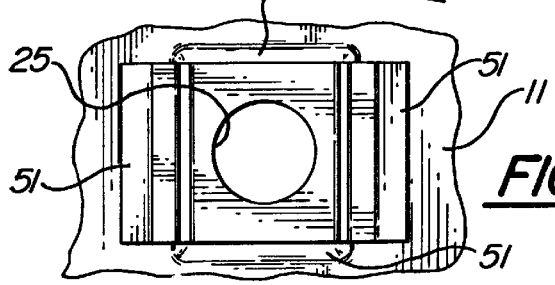

PIERCE NUT MOUNTING DIE

BACKGROUND OF INVENTION

This invention relates to an improved mounting or back-up die for use in fastening a pierce nut to a metal sheet.

Although the shapes and sizes may vary, a typical conventional pierce nut comprises a flat wafer-like piece of metal having a lower portion formed as a punch, for punching a hole through sheet metal, and an integral upper, head portion formed to overlay the punched-hole in the sheet metal. At least a portion of the sheet metal defining the edge of the punched out hole, is deformed into a channel or area provided in the pierce nut for clinching the nut and the sheet together. A threaded opening extends through the pierce nut, for receiving a bolt or screw, after the nut is mounted upon a metal sheet.

Commonly, a series of pierce nuts are arranged edge to edge, in a long chain, with the nuts connected together by a wire or strip of metal which holds the nuts together. The chain of pierce nuts is fed through a machine which includes a pressure applying piston or ram that applies pressure to the head of a pierce nut. The pressure is sufficient to force the punch end of the nut, which is placed upon a metal sheet, to penetrate the sheet and punch out a slug of material. The slug is removed, by gravity, leaving the punch end of the nut in the punched hole. In order to support the sheet metal, as well as to deform portions thereof for interlocking with the pierce nut, a mounting or back-up die is positioned beneath the sheet metal.

One form of conventional mounting or back-up die comprises a cylindrical body having a central opening, through which the punched out slug of sheet material may pass after being punched from the sheet by the pierce nut. The die body has a sheet support end which engages the sheet surface opposite to the surface engaged by the punch portion of the pierce nut. The support end is positioned to engage the sheet around the area of the hole that is made by the pierce nut. The support portion of the die may be in the form of a raised bead which surrounds the central opening formed in the die body through which the slug passes.

Thus, in general, the chain of pierce nuts is fed into the machine whose ram pressure pushes the piece nut through the sheet metal. The sheet metal is supported upon the support end of the die. The punch portion of the pierce nut, punches the hole in the sheet, through which the punch portion extends. Simultaneously to punching, a portion of the sheet material along the edge of the hole is deformed to interlock with the pierce nut for fastening the pierce nut to the sheet.

The mounting die receives considerable pressure and abuse during its use over a substantial period of time. Thus, the bead or support surface of the die frequently wears or breaks to the point where the die must be replaced. Conventionally, when the die bead is no longer suitable for continued use, the entire die must be replaced with a new die. In factory production operations, where numerous pierce nuts are used in manufacturing products, the expenses for replacing dies are relatively high. Therefore, it is desirable to provide a die which lasts longer than conventional dies in production and which resists bead breakage for as long as possible. While harder, sturdier metal materials are available in place of commonly used steel materials in making such dies, typically such materials are too expensive or are too difficult to manufacture to use for such dies. Consequently, it has not been feasible to make a back-up die of more durable or harder materials, such as carbide metals, to reduce wear and breakage.

Therefore, this present invention relates to an improved mounting or back-up die whose support surface lasts longer in use and which can be easily and inexpensively replaced without replacing the entire die or removing the die from the pierce nut mounting equipment.

SUMMARY OF INVENTION

This invention contemplates a pierce nut mounting die which supports a metal sheet while a pierce nut is forcibly pushed through the sheet and which simultaneously distorts portions of the edge of the resulting hole in the sheet into an interlocking engagement with the pierce nut. The mounting die, in general, comprises a tubular body having a removable and replaceable sheet engaging end plug. The plug can be replaced with a new plug whenever its sheet engaging portions become worn or broken without moving or replacing the die body. The plug may be made of a different metal material than the body of the die. For example, the plug may be made of a hard carbide metallic substance while the body may be made of an appropriate steel material. The plug is shaped to slideably fit within a slot or notch formed in the body. The walls of the notch and of the plug are angled relative to the axis of the body, so as to transmit from the plug to the body, and to absorb compressive forces that are applied to the plug during the punching of the hole in the steel. Preferably, the cross-section of the notch and the corresponding cross-section of the plug may be trapezoidal in shape and the sheet metal engaging portions of the plug may be in the form of raised beads formed upon the exposed, narrow, trapezoidal base of the plug.

An object of this invention is to provide a simplified, inexpensive sheet metal engaging and deforming die surface upon a back-up die, which surface may be removed and replaced with a new surface in the event of excess wear or damage, without necessarily disturbing the position of the die or the means for securing the die to other parts of the equipment involved in the mounting of pierce nuts upon sheets.

Another object of this invention is to provide a mounting or back-up die whose sheet metal engaging and deformation portions may be made of a different material then that used for rest of the die body, and which portions can be easily replaced, quickly and manually, without tools, so that the die may be used for a relatively long time and quickly replaced when necessary.

Still another object of this invention is to provide an anvil-like base against which a pierce nut applied against a metal sheet may be pressed for punching an opening in the sheet metal and for distorting the edges surrounding the punched opening into interlocking engagement with the pierce nut, and with the sheet engaging portions of the base being quickly, manually, replaceable with an inexpensive substitute when necessary.

These and other objects and advantages of this invention will become apparent upon reading the following description.

DESCRIPTION OF DRAWINGS

FIG. 1 is an elevational view, partially in cross-section, of the mounting die positioned beneath a metal sheet over which a pierce nut is located, ready for punching the sheet, in response to a pressure ram, which is schematically illustrated.

FIG. 2 is a side elevational view taken in the direction of 2—2 of FIG. 1.

FIG. 3 is a view similar to FIG. 1, but showing the pierce nut penetrating the metal sheet.

FIG. 4 is a perspective, top and side view of the pierce nut mounting die with the die body and the die plug separated.

FIG. 5 is a top view of the die with the plug in place in the die body.

FIG. 6 is a plan view of the pierce nut.

FIG. 7 is an elevational view, in cross-section, of the pierce nut, taken in the direction of arrows 7—7 of FIG. 6.

FIG. 8 is a bottom, plan view of the pierce nut illustrated in FIG. 7.

FIG. 9 illustrates, in perspective, a portion of a connected chain of pierce nuts.

FIG. 10 is a perspective view of the bottom and an end of the pierce nut.

FIG. 11 is a cross-sectional view illustrating the sheet metal clinched within the pierce nut.

FIG. 12 is a top, plan view of the nut and sheet metal segment to which it is attached.

FIG. 13 is a side, elevational view taken in the direction of arrows 13—13 of FIG. 11.

DETAILED DESCRIPTION

Referring to the drawings, FIGS. 6–10 illustrate a conventional pierce nut 10 which is formed of a metal material. The size and shape of the pierce nut may vary considerably depending upon its intended use. In this instance, the illustration shows the pierce nut being approximately rectangular in shape. As shown in FIGS. 3 and 11, the pierce nut is attached to a thin metal sheet 11. In order to attach the nut to the sheet, the sheet is positioned upon a mounting or back-up die 12, which is the subject of this application. A plunger or pressure ram 14 (schematically shown) is positioned upon the upper surface of the nut for pressing the nut against and through the sheet in a manner to be described below. The structure of the nut, in effect, provides a punch which punches a hole through the sheet metal. The edges defining the hole, in turn, are clinched or interlocked with the nut.

The nut is formed within an upper or head portion 20 and an integral, narrow, lower punch portion 21. The head portion defines side shoulders 22 on the opposite sides of the punch portion. Undercut channels 24 are formed in the shoulders along the sides of the punch portion. A threaded hole 25 receives bolts or screws.

A pair of narrow grooves 26 extend along the upper surface or head portion 20. A metal wire 27 may be fastened within the groves, as by soldering or welding or by a suitable adhesive. That permits the assembly of a number of pierce nuts, arranged end to end, to form a chain of nuts connected by the wire. Alternatively, the nuts may be separate for individual use. The chain is useful for automatic machine assembly to sheet metal parts in mass production operations. (See FIG. 11).

The mounting die 12 is formed of a tube 30 which may be either round, that is, cylindrical, or of some other cross-sectional shape. An axially aligned hole 31 extends through the tube from the upper, support end 32 of the tube to the lower, bottom end 33 of the tube.

The upper, support end portion of the tube is provided with a notch 35 which extends laterally of the axis of the tube. Preferably, the notch is provided with sloped walls 36 and a flat base 37 which forms, a trapezoidal shape in cross-section. The narrow base of the trapezoid is open.

A metal support plug or insert 40 is held within the notch 35. The plug has angled side walls 41 and a base 42 which correspond in size and shape to the trapezoidal shaped notch walls 36 and 37. Thus, the plug may be slid endwise into the notch where the plug is substantially in face to face contact with the walls defining the notch.

The walls of the notch and plug may be arranged at different angles with the angularity of the walls being determined by calculating the anticipated forces that will be applied against the plug by the ram. The angularity enables the forces to be transmitted to the die body from the plug, so that the forces are absorbed a substantial degree by the body. One preferred angle is approximately five degrees relative to the axis of the tubular body of the die for each of the angled walls defining the notch and, correspondingly, the plug.

The plug 40 has an exposed support surface 43 upon which a raised bead 44 is formed. Two opposite sides 45 of the bead may be sloped at an angle. The other two opposite sides 46 of the bead may be straight, that is parallel to the axis of the plug or coplanar with the side walls 41 of the plug. Preferably the bead is rectanglar or square. However, the bead may be interrupted or only partial, depending upon the amount of interlock desired to be produced between the sheet and the nut.

The bead surrounds or is along the side of an axially aligned hole or opening 47 formed in the plug. The opening 47 is in alignment with the axially aligned hole 31 in the tubular body of the die.

In operation, a pierce nut is positioned upon a metal sheet and the sheet is rested upon the raised bead 44 located on the support surface 43 of the plug 40. (see FIG. 1). The plunger or pressure ram 14 moves downwardly against the upper surface of the pierce nut. As the ram progresses downwardly, the pierce nut is transformed into a punch which punches a hole 49 in the sheet. (see FIG. 3). The slug 50, which is punched out of the sheet to provide the hole, passes through the opening 47 in the plug and then through the opening or hole 31 in the body of the die for removal. Thus, if the die is vertical, gravity will cause the slug to pass through the aligned holes which are of a size and shape to accommodate the slug. If the die is arranged horizontally or at an angle to the horizontal, the slugs will bunch together in the holes. Thus, continued punching will advance each slug through the holes until ultimately each slug is pushed out of the die body by the succeeding slugs.

As illustrated in FIGS. 3 and 11, the raised bead 44 indents and deforms the area of the sheet which defines the punched hole during the time that the ram pushed the pierce nut through the sheet. The sheet material portion 52 that is deformed is bent into the undercut channels or reception areas 24 located in the shoulders 22 to clinch or interlock the nut and the sheet material. On the opposite ends of the nut, that is, the ends that are transverse to the undercut channels, the sheet material defining the hole is deformed upwardly into bulged lips 51 which hold the pierce nut against endwise movement relative to the channels 24.

As indicated in the drawings at FIG. 7, for example, the undercut channels 24 may be trapezoidal in shape in order to better interlock with the deformed edges or lips 51 of the sheet hole. However, the size and shape of the channels and the lengths of the channels may be varied. Alternatively, depressions rather than continuous channels may be provided depending upon the design of the particular pierce nuts involved.

With this construction, when the bead wears out over a period of usage or is broken, as happens in this type of assembly, the plug may be pushed endwise out of the notch in the die body. An identical plug may then be pushed into the notch. Alternatively, the plug may be changed in order to change its bead configuration to handle different size or shape pierce nuts. The plug may be removed and replaced without moving the die body from the holder of machine in which it is mounted. Such machines are conventional and are not described here since they form no part of this invention. But, typically they include a socket or holder to hold the mounting die in operable position.

Significantly, with this construction, the plug may be made of a different metal than the tubular body of the die. Typically, such dies have been made of a suitable steel material. However, in order to increase the life expectancy of the product and to enable it to sustain higher pressures during the assembly of nut to the sheet, the plug may be made of a harder or less breakable metal material than the body. For example, the plug may be made of a carbide type material, such as tungsten carbide or the like, in order to give it great hardness. And, it may be heat or surface treated or formed of a material which has greater wear resistance than the steel materials used for the die body. Consequently, an advantage of this construction is that the portion of the die which contacts the sheet material and which deforms the sheet material may be made of a more durable type of metal than the balance of the die. Further, the die body may be made of a metal material which better absorbs loads, such as by being more resilient that the material used for the plug. This ability to use different material for the plug and die body makes it economically feasible to produce plugs which may be made of more expensive material than the reusable die bodies.

This invention may be further developed within the scope of the following claims. Accordingly, it is desired that the foregoing description be read as being merely illustrative of an operative embodiment of this invention and not in a strictly limited sense. Having filly described an operative embodiment of this invention, I now claim:

1. A pierce nut attachment die for use in supporting a thin metal sheet while the sheet is forcibly punctured by a pierce nut of the type having a lower punch portion formed to punch out a portion of the sheet to produce a hole through the sheet and to extend through said hole, and an upper, integral head portion formed to overlie the punched-out hole, and the pierce nut having an undercut portion for receiving material defining a portion of the peripheral edge of the hole for interlocking the pierce nut and the sheet, comprising:

a tubular die body having a size to be placed into a die holder in a machine, said tubular die body having a sheet support end and an axially arranged opening extending through the body and being of a size to receive and pass the material punched-out of the sheet opening by the pierce nut punch portion;

said die body having a transversely arranged notch formed in its support end with the notch having a pair of spaced apart, opposed side walls and a base with said opening passing through said base and with the notch opening in an axially endwise direction relative to the body support end;

a plug of a cross-sectional shape and size corresponding to the cross-sectional shape and size of the notch for positioning the plug snugly within the notch and with the plug having side walls and a base arranged in substantial face to face contact with said spaced apart, opposed side walls and base;

said plug having a sheet support face having a raised bead for engaging a sheet and an opening through the plug which is coaxial with the opening in the body of the die;

said bead being positioned to engage and support the sheet face opposite to the area covered by the punch portion of the nut when the nut punch portion is forcibly pushed against and through the sheet so that the punched out portion of the sheet passes through the opening in the plug and then into the axial opening in the base and simultaneously the bead deforms a portion of the sheet material into said undercut portion of the nut for clinching the nut to the sheet;

wherein compressive forces that are applied to the plug by the punch portion of the nut are transferred from the plug to the walls and base of the notch, and whereby the plug may be removed from the notch and replaced with a similar plug when the plug bead becomes worn or broken due to repeated usage without necessity of removing the die body from the die holder in the machine.

2. A pierce nut attachment die as defined in claim 1, and said die body being formed of a metal material and said plug being formed of a different, harder metal than the metal forming the die body.

3. A pierce nut mounting die as defined in claim 1, and said bead substantially continuously extending around the periphery of the opening formed in the plug.

4. A pierce nut attachment die as defined in claim 1, and the notch being of a trapezoidal cross-sectional shape, with the walls defining said notch being sloped inwardly, towards each other, relative to a plane extending through an axis of the opening in the base, towards the support end of the body, and with the plug being correspondingly trapezoidal in cross sectional shape.

5. A pierce nut attachment die as defined in claim 4, and including said bead substantially surrounding the peripheral edge of the opening formed in the plug; and said plug and the base each being formed of a metal material, but with the plug being of a different, harder metal than the metal forming the base.

6. A pierce nut attachment die as defined in claim 5, and said body being generally cylindrical in cross section and the hole in the body generally corresponding to the size and shape of the portions of the sheet punched out of the sheet by the punched portion of the pierce nut for passing said punched out portions through the die.

7. In a pierce nut mounting die for a attaching a pierce nut to a metal sheet, with the pierce nut being generally formed with a punch portion shaped to punch out a slug of material from the sheet and with a head portion integral with the punch portion for overlying the punched out hole formed in the sheet, and with the pierce nut having a reception area for receiving and interlocking with a portion of the material of the sheet adjacent to the punched-out hole, and with the die having a die body for positioning within a die holder of a machine, the die body with a support end for supporting and engaging the sheet along the edges of the opening punched out of the sheet by the punch portion of the pierce nut, said support end including a raised bead which engages and deforms a portion of the sheet adjacent the punched out opening for interlocking the deformed material with the reception area for clinching the pierce nut to the sheet, the improvement comprising:

the support end of the die body being provided with a transversely arranged notch opening endwise and axially of the axis of the body;

a die insert plug of a cross-sectional shape and size corresponding to the cross-sectional shape and size of the notch for positioning the plug within the notch so that the plug side walls and base are arranged, respectively, in substantial face to face contact with notch side walls and base;

said bead being formed on the exposed face of the plug;

said plug being manually removable and replaceable with a similar plug when the bead formed thereon is damaged or worn due to usage without the die body being removed from the die holder in the machine.

8. A pierce nut mounting die as defined in claim 7, and wherein said notch is formed, in cross section, in the shape of a trapezoid so that the walls defining the notch slope inwardly, towards each other, relative to an axis of the die body and the narrow base of the notch shape opening at the support end;

and the plug being correspondingly trapezoidal shaped in cross section for snugly fitting within the notch and for transmitting forces applied to the plug during the punching of the hole in the sheet by the pierce nut, to the walls and base of the notch.

9. A pierce nut mounting die as defined in claim 8, and including said die body being formed of a metal material and the plug being formed of a different metal material which is more resistant to wear and breakage than the metal material forming the die body.

10. A pierce nut mounting die as defined in claim 9, and including said bead being substantially continuous and surrounding the edge of an opening formed in the plug, which opening is of a size and shape to receive the punched out portion of the sheet;

and said opening being axially aligned with a corresponding opening extending through the die body for receiving such punched out portions from the opening in the plug.

* * * * *